US007461001B2

(12) United States Patent
Liqin et al.

(10) Patent No.: US 7,461,001 B2
(45) Date of Patent: Dec. 2, 2008

(54) SPEECH-TO-SPEECH GENERATION SYSTEM AND METHOD

(75) Inventors: Shen Liqin, Beijing (CN); Shi Qin, Beijing (CN); Donald T. Tang, Mount Kisco, NY (US); Zhang Wei, ShangZhuang (CN)

(73) Assignee: International Business Machines Corporation, Armonk, NY (US)

( * ) Notice: Subject to any disclaimer, the term of this patent is extended or adjusted under 35 U.S.C. 154(b) by 732 days.

(21) Appl. No.: 10/683,335

(22) Filed: Oct. 10, 2003

(65) Prior Publication Data

US 2004/0172257 A1 Sep. 2, 2004

(51) Int. Cl.
*G10L 11/00* (2006.01)
*G10L 15/00* (2006.01)
*G10L 13/08* (2006.01)

(52) U.S. Cl. ........................ 704/277; 704/235; 704/260

(58) Field of Classification Search ....................... None
See application file for complete search history.

(56) References Cited

U.S. PATENT DOCUMENTS 5,546,500 A * 8/1996 Lyberg ....................... 704/277
5,933,805 A * 8/1999 Boss et al. .................. 704/249

FOREIGN PATENT DOCUMENTS

| | | |
|---|---|---|
| JP | PUPA 04-355555 | 12/1992 |
| JP | PUPA 06-332494 | 12/1994 |
| JP | PUPA 07-181997 | 7/1995 |
| JP | PUPA 11-265195 | 9/1999 |
| WO | WO97/34292 | 9/1997 |
| WO | WO 97/43756 | * 11/1997 |

* cited by examiner

*Primary Examiner*—David R. Hudspeth
*Assistant Examiner*—Samuel G Neway
(74) *Attorney, Agent, or Firm*—Anne Vachon Dougherty

(57) ABSTRACT

An expressive speech-to-speech generation system and method which can generate expressive speech output by using expressive parameters extracted from the original speech signal to drive the standard TTS system. The system comprises: speech recognition means, machine translation means, text-to-speech generation means, expressive parameter detection means for extracting expressive parameters from the speech of language A, and expressive parameter mapping means for mapping the expressive parameters extracted by the expressive parameter detection means from language A to language B, and driving the text-to-speech generation means by the mapping results to synthesize expressive speech. The system and method can improve the quality of the speech output of the translating system or TTS system.

6 Claims, 9 Drawing Sheets

SPEECH-TO-SPEECH GENERATION SYSTEM AND METHOD

FIELD OF THE INVENTION

This invention relates generally to the field of machine translation, and in particular to an expressive speech-to-speech generation system and method.

BACKGROUND OF THE INVENTION

Machine translation is a technique to convert the text or speech of a language to that of another language by using a computer. In other words, the machine translation is to automatically translate one language into another language without the involvement of human labor by using the huge memory capacity and digital processing ability of computer to generate dictionary and syntax with mathematics method, based on the theory of language formation and structure analysis.

Generally speaking, current machine translation system is a text-based translation system, which translates the text of one language to that of another language. But with the development of society, the speech-based translation system is needed. By using current speech recognition technique, text-based translation technique and TTS (text-to-speech) technique, a first language speech may be recognized with the speech recognition technique and transformed into the text of the language; then the text of the first language is translated into that of a second language, based on which, the speech of the second language is generated by using the TTS technique.

However, the existing TTS systems usually produce inexpressive and monotonous speech. For a typical TTS system available today, the standard pronunciations of all the words (in syllables) are first recorded and analyzed, and then relevant parameters for standard "expressions" at the word level are stored in a dictionary. A synthesized word is generated from the component syllables, with standard control parameters defined in a dictionary, using the usual smoothing techniques to stitch the components together. Such a speech production cannot create speech that is full of expressions based on the meanings of the sentence and the emotions of the speaker.

Therefore, what is needed, and is an object of the present invention is a system and method to provide an expressive speech-to-speech system and method.

SUMMARY OF THE INVENTION

According to the embodiment of the present invention, an expressive speech-to-speech system and method uses expressive parameters obtained from the original speech signal to drive a standard TTS system to generate expressive speech. The expressive speech-to-speech system and method of the present embodiment can improve the speech quality of translating system or TTS system.

BRIEF DESCRIPTION OF THE DRAWINGS

The aforementioned and further objects and features of the invention could be better illustrated in the following detailed description with accompanying drawings. The detailed description and embodiments are only intended to illustrate the invention.

DETAILED DESCRIPTION OF THE PREFERRED EMBODIMENTS

Figure 1:
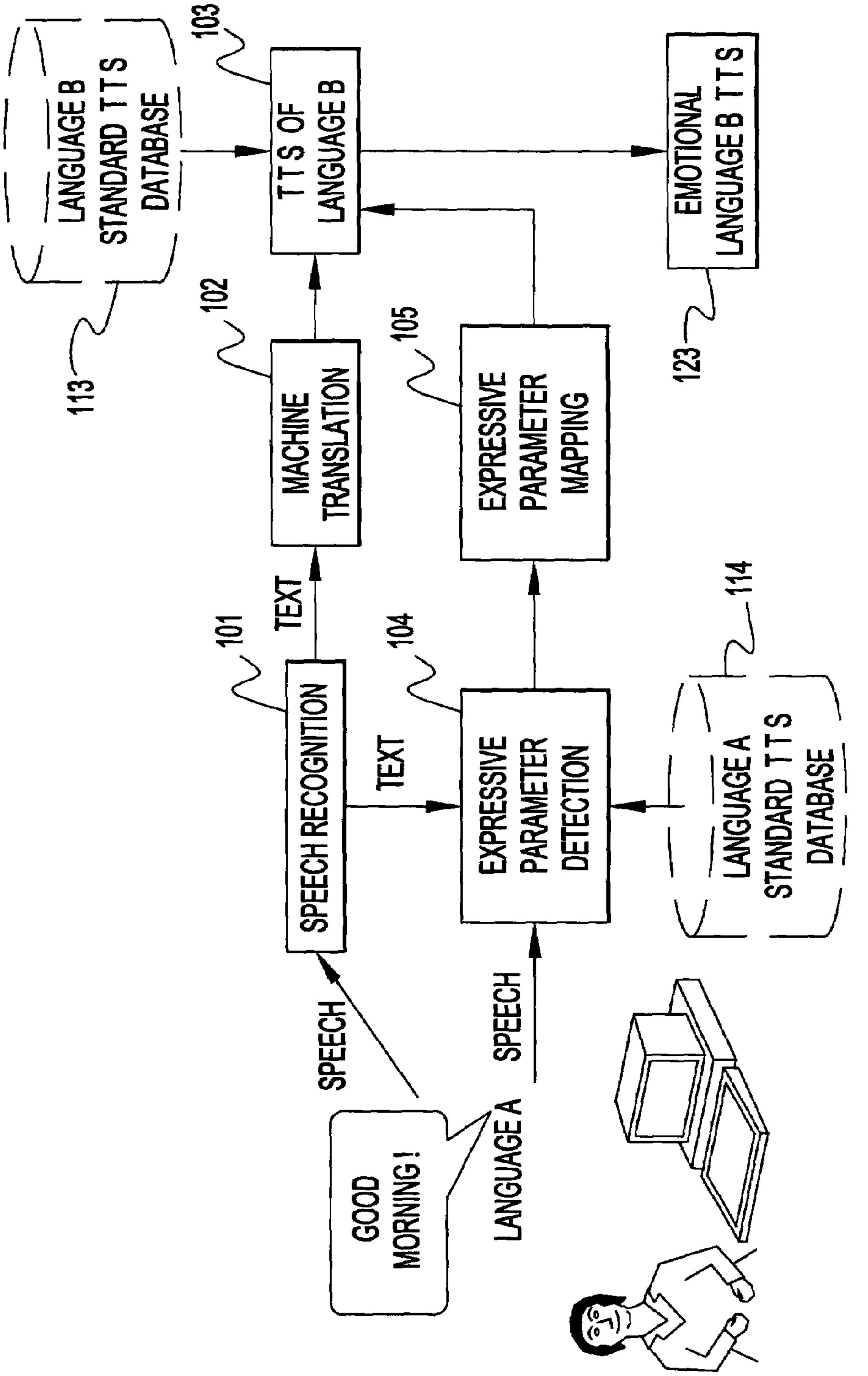
FIG. 1 is a block diagram of an expressive speech-to-speech system according to the present invention.

As shown in FIG. 1, an expressive speech-to-speech system according to an embodiment of the present invention comprises: speech recognition means 101, machine translation means 102, text-to-speech generation means 103, expressive parameter detection means 104 and expressive parameter mapping means 105. The speech recognition means 101 is used to recognize the speech of language A using language A Standard TTS database 114 and create the corresponding text of language A; the machine translation means 102 is used to translate the text from language A to language B using language B Standard TTS database 113; the text-to-speech generation means 103 is used to generate the speech of language B according to the text of language B; the expressive parameter detection means 104 is used to extract expressive parameters from the speech of language A; and the expressive parameters mapping means 105 is used for mapping the expressive parameters extracted by the expressive parameter detection means from language A to language B and drive the text-to-speech generation means 123 by the mapping results to synthesize expressive speech.

As known to those skilled in the art, there are many prior arts to accomplish the Speech Recognition Means, Machine Translation Means and TTS Means. So we only describe expressive parameter detection means and expressive parameter mapping means according to an embodiment of this invention with FIG. 2 and FIG. 3.

Firstly, the key parameters that reflect the expression of speech were introduced. The key parameters of speech, which control expression, can be defined at different levels.

1. At word level, the key expression parameters are: speed (duration), volume (energy level) and pitch (including range and tone). Since a word generally consists of several characters/syllables (most words have two or more characters/syllables in Chinese), such expression parameters must also be defined at the syllable level, in the form of vectors or timed sequences. For example, when a person speaks angrily, the word volume is very high, the words pitch is higher than normal condition and its envelope is not smooth, and many of pitch mark points even disappear. And at the same time the duration becomes shorter. Another example is that when we speak a sentence in a normal way, we would probably emphasize some words in the sentence, changing the pitch, energy and duration of these words.

2. At sentence level, we focus on the intonation. For example, the envelope of an exclamatory sentence is different from that of a declarative statement.

Figure 2:
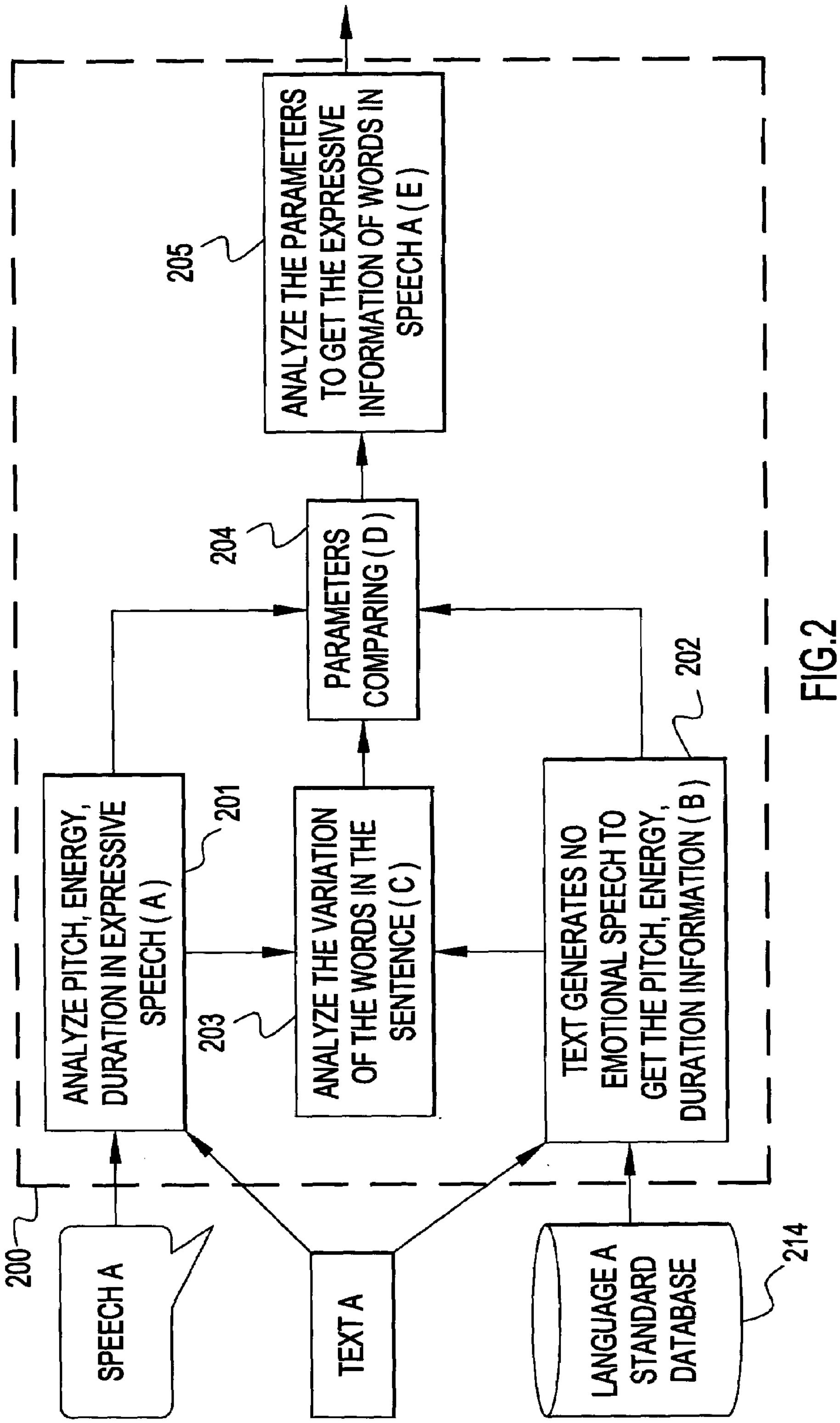
FIG. 2 is a block diagram of an expressive parameter detection means in FIG. 1 according to an embodiment of the present invention.

The following is to describe how the expressive parameter detection means and the expressive parameter mapping means work according to this invention with FIG. 2 and FIG. 3. That is how to extract expressive parameters and use the extracted expressive parameters to drive the text-to-speech generation means to synthesize expressive speech.

As shown in FIG. 2, the expressive parameter detection means 200 of the invention includes the following components:

Part A: Analyze the pitch, duration and volume of the speaker. In Part A, the invention exploits the result of Speech Recognition using Language A Standard database 214 to get the alignment result between speech and words (or characters). And record it in the following structure:

```
Sentence Content
{
    Word Number;
    Word Content
{ Text;
    Soundslike;
        Word position;
        Word property;
    Speech start time;
    Speech end time;
    *Speech wave;
    Speech parameters Content
        { * absolute parameters;
            *relative parameters;
        }
}
}
```

Then a Short Time Analysis method is used to get such parameters:

1. Short time energy of each Short Time Window.
2. Detect the pitch contour of the word.
3. The duration of the words.

According to these parameters, the following parameters are obtained:

1. Average Short time energy in the word.
2. Top N short time energy in the word.
3. Pitch range, maximum pitch, minimum pitch, and the value of the pitch in the word.
4. The duration of the word.

Part B: according to the text of the result of speech recognition, a standard language A TTS System is used to generate the speech of language A without expression, and then analyze the parameters of the no expressive TTS. The parameters are the reference of analysis of expressive speech.

Part C: the variation of the parameters is analyzed for these words in a sentence forming expressive and standard speech. The reason is that different people speak with different volume and pitch at different speeds. Even for a person, when he speaks the same sentences at different time, these parameters are not the same. So in order to analyze the role of the words in a sentence according to the reference speech, the relative parameters are used.

A normalized parameter method is used to get the relative parameters from absolute parameters. The relative parameters are:

1. The relative average Short time energy in the word.
2. The relative Top N short time energy in the word.
3. The relative Pitch range, relative maximum pitch, relative minimum pitch in the word.
4. The relative duration of the word.

Part D: the expressive speech parameters are analyzed at word level and at sentence level according to the reference that comes from the standard speech parameters.

1. At the word level, the relative parameters of the expressive speech are compared with those of the reference speech to see which parameters of words vary violently.
2. At the sentence level, the words are sorted according to their variation level and word property, to get the key expressive words in the sentences.

Part E: according to the result of parameters comparison and the knowledge that what certain expression will cause what parameters vary, the expressive information of the sentence is obtained, (i.e., the expressive parameters are detected and the parameter recorded according to the following structure:

```
Expressive information
{
Sentence expressive type;
Words content
    {           Text;
                Expressive type;
                Expressive level;
                *Expressive parameters;
};
            }
```

For example, when "í•!" is spoken angrily in Chinese, many pitches disappear, and the absolute volume is higher than reference and at the same time the relative volume is very sharp, and the duration is much shorter than the reference. Thus, it can be concluded that the expression at the sentence level is angry. The key expressive word is "íš{".

Figure 3A:
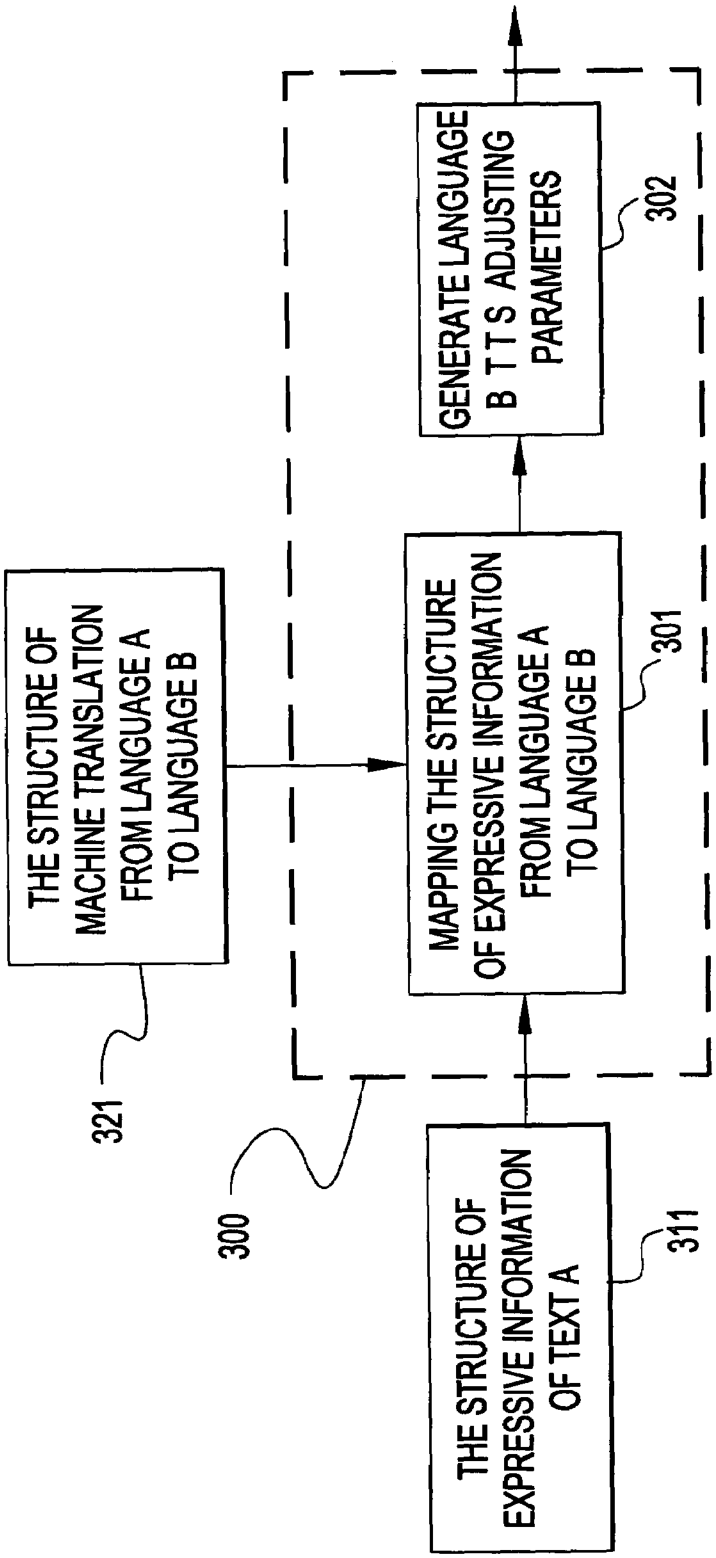
FIG. 3 is a block diagram showing an expressive parameter mapping means in FIG. 1 according to an embodiment of the present invention.
Figure 3B:
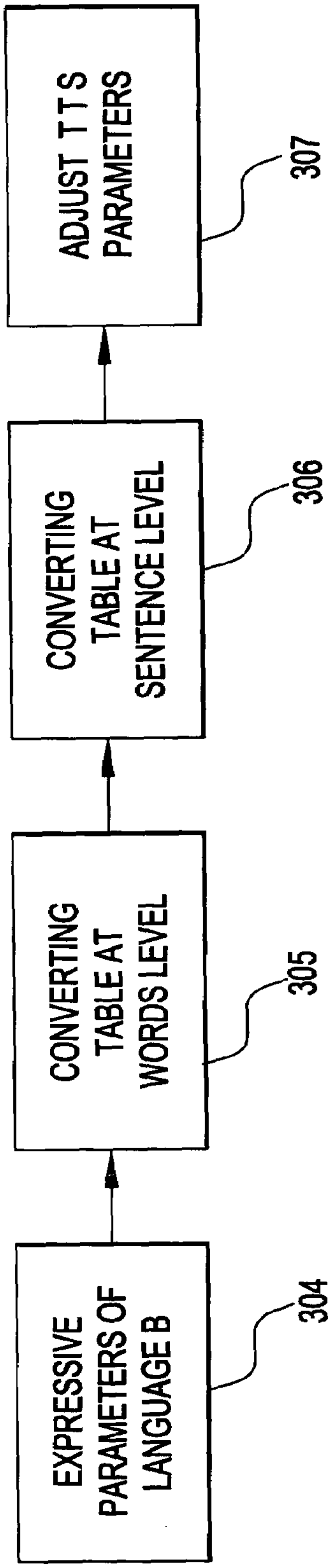

The following is to describe how the expressive parameter mapping means 300 according to an embodiment of this invention is structured, with reference to FIG. 3A and FIG. 3B. The expressive parameter mapping means comprises:

Part A at 301: Mapping the structure of expressive parameters from language A to language B according to the machine translation result using the structure of the expressive information of text A, 311, and the structure of the machine translation from A to B, 321.The key method is to find out what words in language B correspond to which the words in language A, which are important for showing expression. The following is the mapping result:

```
Sentence content for language B
{
            Sentence Expressive type;
word content of language B
{   Text;
        Soundslike;
        Position in sentence;
        Word expressive information in language A;
        Word expressive information in language B;
}
}
```

-continued

```
Word expressive of language A
    {           Text;
                Expressive type;
                Expressive level;
                *Expressive parameters;
    }
                Word expressive of language B
    {
Expressive type;
Expressive level;
*Expressive parameters;
}
```

Part B at 302: Based on the mapping result of expressive information, the adjustment parameters that can drive the TTS for language are generated. By this means, an expressive parameter table of language B, 304, is used to give out which words use what set of parameters according to the expressive parameters. The parameters in the table are the relative adjusting parameters.

The process is shown in FIG. 3B. The expressive parameters are converted by converting tables of two levels (words level converting table and sentence level converting table), and become the parameters for adjusting the text-to-speech generation means.

The converting tables of the two levels are:

1. The word level converting table, 305 for converting expressive parameters to the parameters that adjust TTS.

The following is the structure of the table:

Structure of Word TTS Adjusting Parameters Table

```
{
        Expressive_Type ;
        Expressive_Para;
            TTS adjusting parameters;
};
Structure of TTS adjusting parameters
{
        float Fsen_P_rate;
            float Fsen_am_rate;
            float Fph_t_rate;
            struct Equation Expressive_equat; ( for changing the
curve characteristic of pitch contour)
    };
```

2. The sentence level converting table at 306, for giving out the prosody parameters of the sentence level according to emotional type of the sentence to adjust the parameters at the word level adjustment TTS 307.

Structure of Sentence TTS Adjusting Parameters Table

```
{
        Emotion_Type ;
            Words_Position;
            Words_property;
TTS adjusting parameters;
};
Structure of TTS adjusting parameters
{
        float Fsen_P_rate;
        float Fsen_am_rate;
        float Fph_t_rate;
        struct Equation Expressive_equat; ( for changing the
curve characteristic of pitch contour)
    };
```

Figure 4:
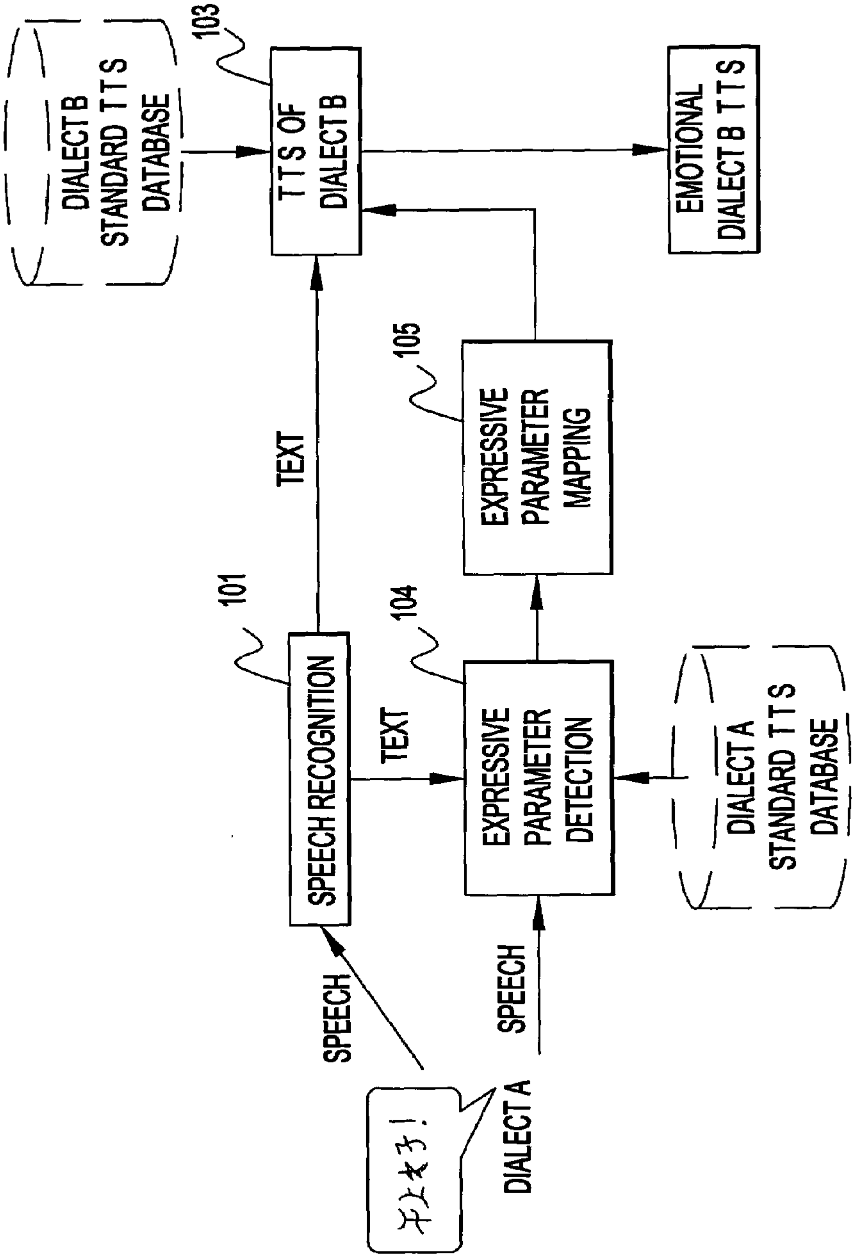
FIG. 4 is a block diagram showing an expressive speech-to-speech system according to another embodiment of the present invention.

The speech-to-speech system according to the present invention has been described as above in connection with embodiments. As known to those skilled in the art, the present invention can also be used to translate different dialects of the same language. As shown in FIG. 4, the system is similar to that in FIG. 1. The only difference is that the translation between different dialects of the same language does not need the machine translation means. In particular, the speech recognition means 101 is used to recognize the speech of dialect A and create the corresponding text of dialect A; the text-to-speech generation means 103 is used to generate the speech of dialect B according to the text of dialect B; the expressive parameter detection means 104 is used to extract expressive parameters from the speech of dialect A using database 134; and the expressive parameter mapping means 105 is used to map the expressive parameters extracted by expressive parameter detection means 104 from dialect A to dialect B using dialect B database 133 and drive the text-to-speech generation means 143 with the mapping results to synthesize expressive speech.

The expressive speech-to-speech system according to the present invention has been described in connection with FIG. 1-4. The system generates expressive speech output by using expressive parameters extracted from the original speech signals to drive the standard TTS system.

The present invention also provides an expressive speech-to-speech method. The following is to describe an embodiment of speech-to-speech translation process according to the invention, with FIG. 5-8.

Figure 5:
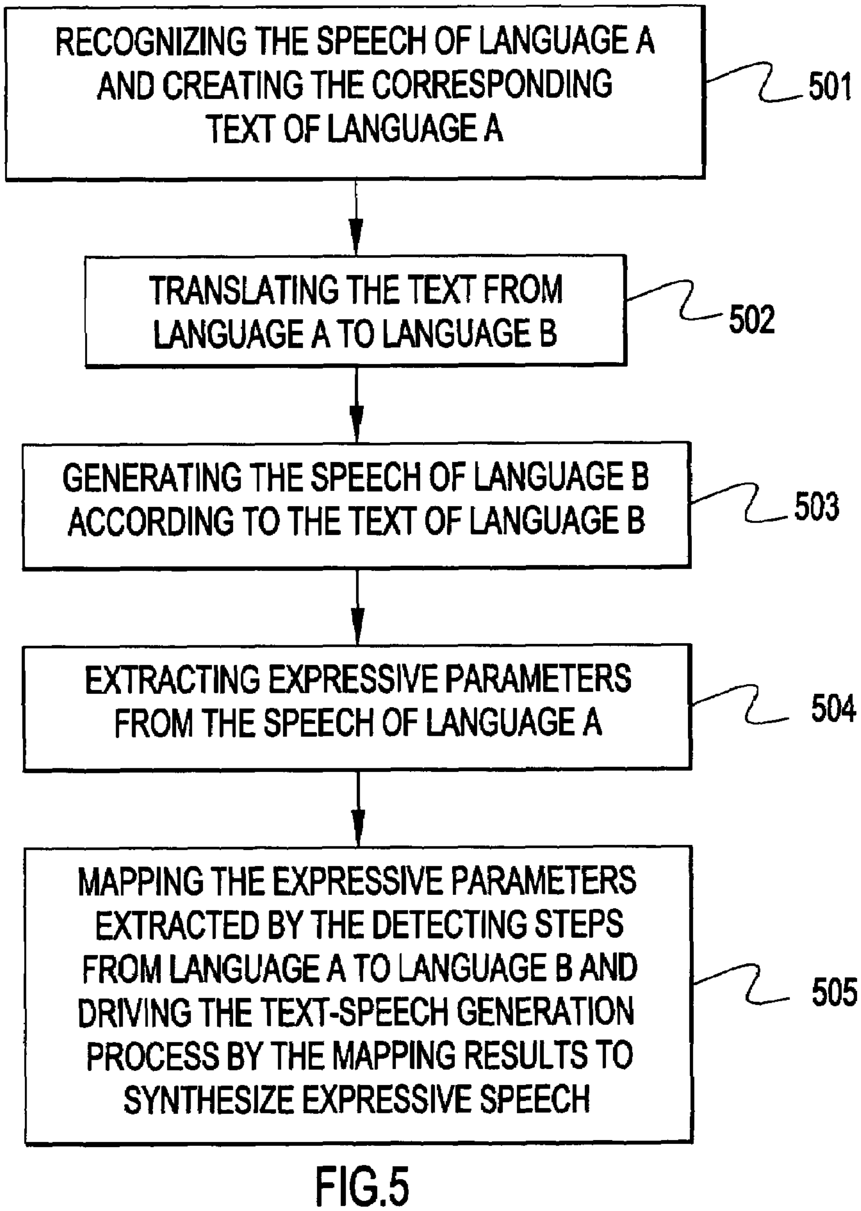
FIG. 5 is a flowchart showing procedures of expressive speech-to-speech translation according to an embodiment of the present invention.

As shown in FIG. 5, an expressive speech-to-speech method according to an embodiment of the invention comprises the steps of: recognizing the speech of language A and creating the corresponding text of language A (501); translating the text from language A to language B (502); generating the speech of language B according to the text of language B (503); extracting expressive parameters from the speech of language A (504); and mapping the expressive parameters extracted by the detecting steps from language A to language B, and driving the text-to-speech generation process by the mapping results to synthesize expressive speech (505).

Figure 6:
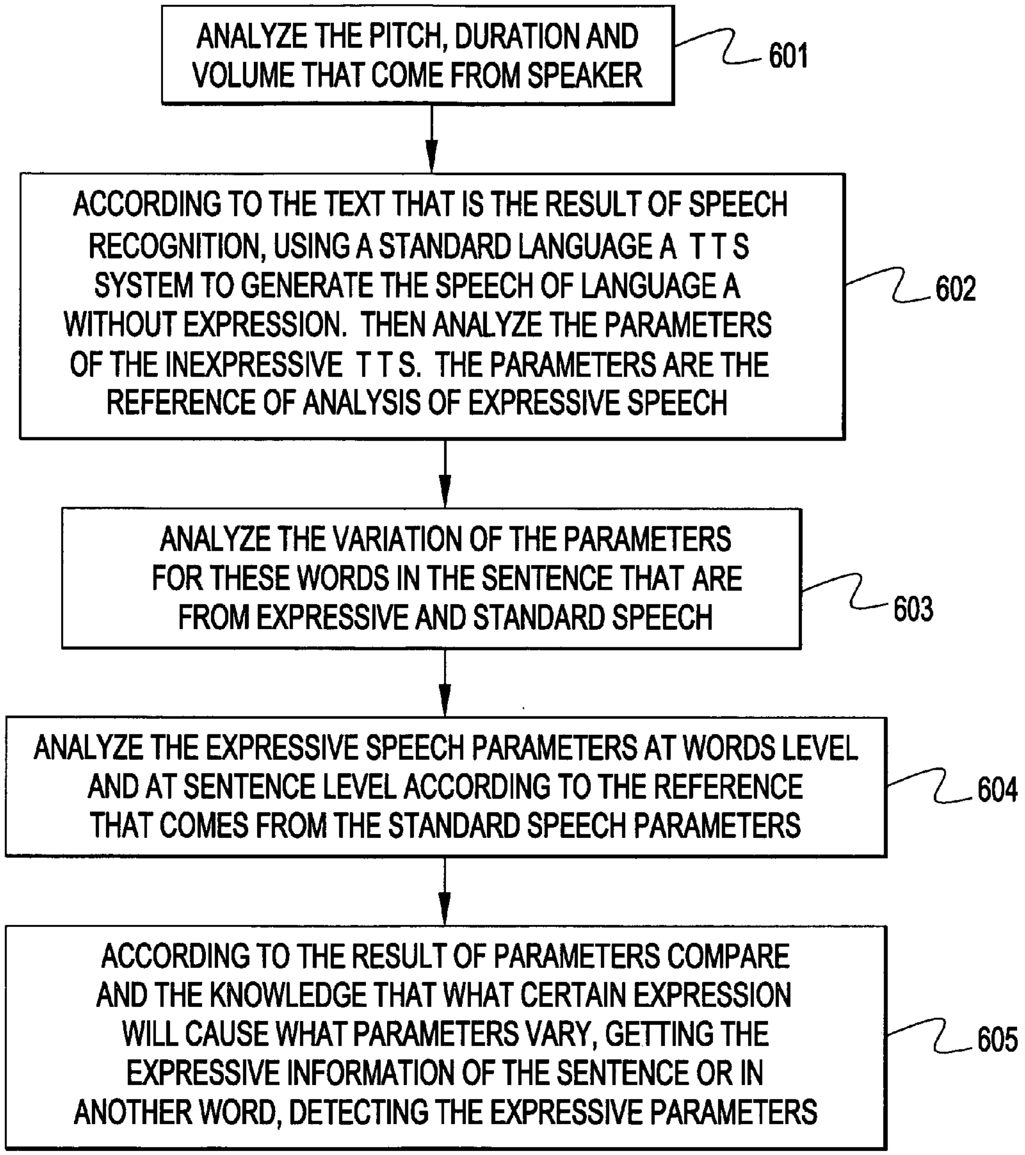
FIG. 6 is a flowchart showing procedures of detecting expressive parameters according to an embodiment of the present invention.
Figure 7:
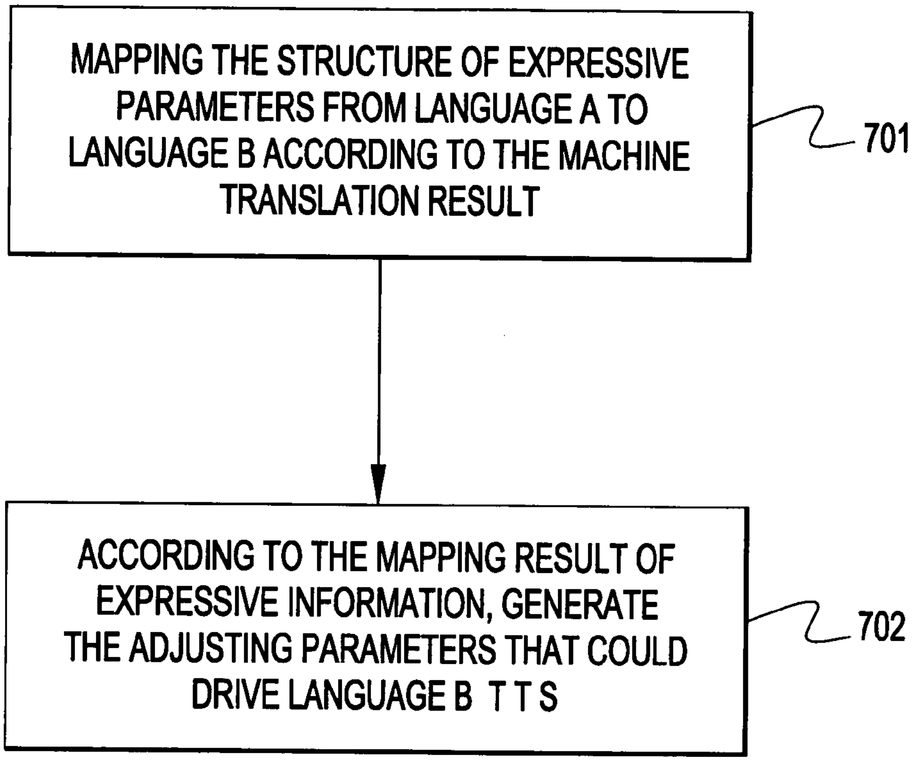
FIG. 7 is a flowchart showing procedures of mapping detecting expressive parameters and adjusting TTS parameters according to an embodiment of the present invention.

The following is to describe the expressive detection process and the expressive mapping process according to an embodiment of the present invention, with FIG. 6 and FIG. 7. That is how to extract expressive parameters and use the extracted expressive parameters to drive the existing TTS process to synthesize expressive speech.

As shown in FIG. 6, the expressive detection process comprises the steps of:

Step 601: analyze the pitch, duration and volume of the speaker. In Step 601, the result of speech recognition is exploited to get the alignment result between speech and words (or characters). Then the Short Time Analyze method is used to get such parameters:

1. Short time energy of each Short Time Window.
2. Detect the pitch contour of the word.
3. The duration of the words.

According to these parameters, the following parameters are obtained:

1. Average Short time energy in the word.
2. Top N short time energy in the word.
3. Pitch range, maximum pitch, minimum pitch, and pitch number in the word.
4. The duration of the word.

Step 602: according to the text that is the result of speech recognition, a standard language A TTS System is used to generate the speech of language A without expression. Then the parameters of the inexpressive TTS are analyzed. The parameters are the reference of analysis of expressive speech.

Step 603: the variation of the parameters are analyzed for these words in the sentence that are from expressive and standard speech. The reason is that different people maybe speak with different volume, different pitch, at different speed. Even for a person, when he speaks the same sentences at different time, these parameters are not the same. So in order to analyze the role of the words in the sentence according to the reference speech, the relative parameters are used.

The normalized parameter method is used to get the relative parameters from absolute parameters. The relative parameters are:

1. The relative average short time energy in the word.
2. The relative top N short time energy in the word.
3. The relative pitch range, relative maximum pitch, relative minimum pitch in the word.
4. The relative duration of the word.

Step 604: the expressive speech parameters are analyzed at word level and at sentence level according to the reference that comes from the standard speech parameters.

1. At the word level, the relative parameters of the expressive speech are compared with those of the reference speech to see which parameters of which words vary drastically.
2. At the sentence level, the words are sorted according to their variation level and word property, to get the key expressive words in the sentences.

Step 605: according to the result of parameters comparison and the knowledge that what certain expression will cause what parameters to vary, the expressive information of the sentence is obtained (i.e., the expressive parameters are detected).

Next, the expressive mapping process according to an embodiment of the present invention is described in connection with FIG. 7. The process comprises steps of:

Step 701: mapping the structure of expressive parameters from language A to language B according to the machine translation result. The key method is to find out the words in language B corresponding to those in language A that are important for expression transfer.

Step 702: according to the mapping result of expressive information, generate the adjusting parameters that could drive language B TTS. By this means, expressive parameter table of language B is used, according to which the word or syllable synthesis parameters are provided.

Figure 8:
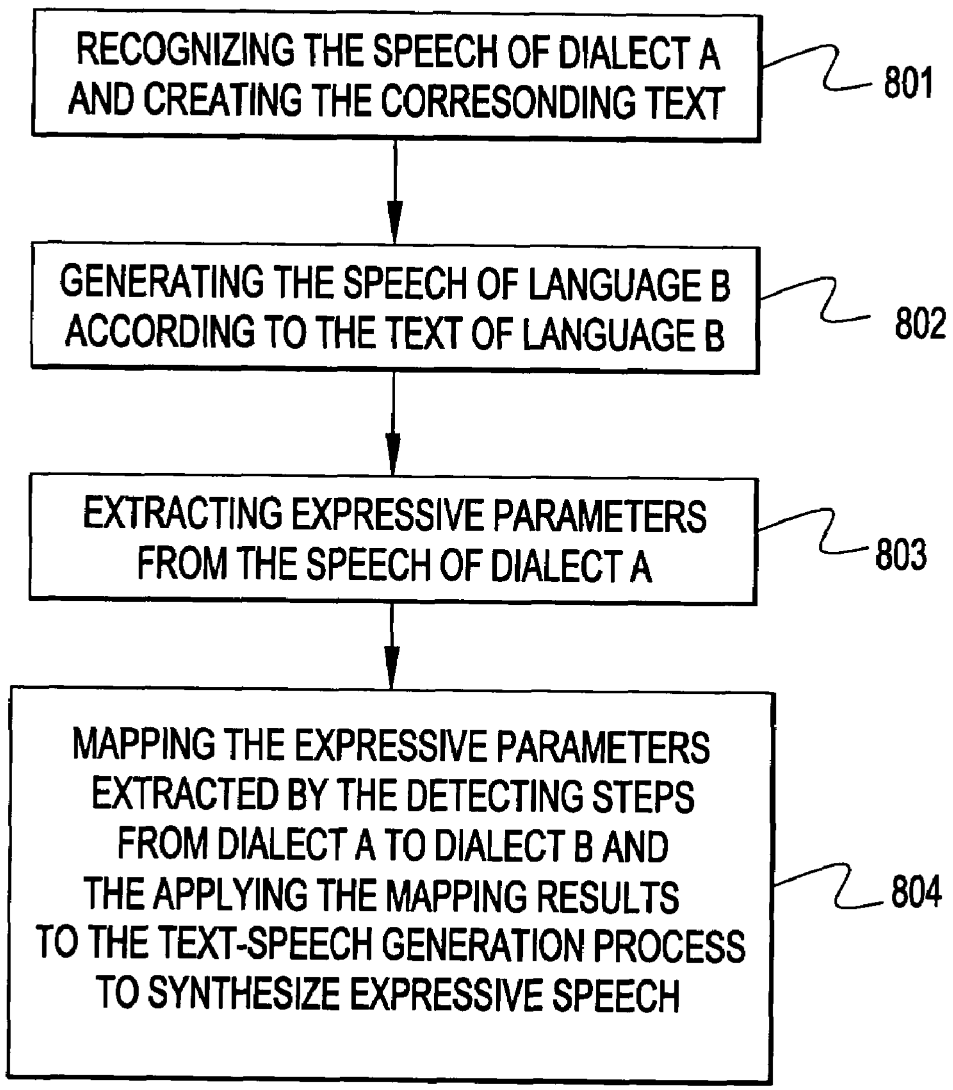
FIG. 8 is a flowchart showing procedures of expressive speech-to-speech translation according to another embodiment of the present invention.

The speech-to-speech method according to the present invention has been described in connection with embodiments. As known to those skilled in the art, the present invention can also be used to translate different dialects of the same language. As shown in FIG. 8, the processes are similar to those in FIG. 5. The only difference is that the translation between different dialects of the same language does not need the text translation process. In particular, the process comprises the steps of: recognizing the speech of dialect A, and creating the corresponding text (801); generating the speech of language B according to the text of language B (802); extracting expressive parameters from the speech of dialect A (803); and mapping the expressive parameters extracted by the detecting steps from dialect A to dialect B and then applying the mapping results to the text-to-speech generation process to synthesize expressive speech (804).

The expressive speech-to-speech system and method according to the preferred embodiment have been described in connection with figures. Those having ordinary skill in the art may devise alternative embodiments without departing from the spirit and scope of the present invention. The present invention includes all those modified and alternative embodiments. The scope of the present invention shall be limited by the accompanying claims.

The invention claimed is:

1. A speech-to-speech generation method, comprising the steps of:

recognizing the speech of language A and creating the corresponding text of language A;

translating the text from language A to language B;

generating the speech of language B according to the text of language B, said speech-to-speech method is characterized by further comprising the steps of:

extracting expressive parameters from the speech of language A, said expressive parameters comprising pitch, volume and duration at a word level and intonation and sentence envelope at a sentence level;

obtaining normalized expressive parameters for language A based on a degree of variation of pitch, volume and duration at a word level and intonation and sentence envelope at a sentence level for words in a sentence and deriving relative expressive parameters from the normalized parameters;

comparing relative parameters of expressive speech with those of reference speech to identify varying relative parameters to be provided to said expressive parameter mapping means; and mapping the identified varying relative parameters extracted by the detecting steps from language A to language B to obtain adjustment parameters for language B, and driving the text-to-speech generation process using the adjustment parameters mapping results to synthesized expressive speech in language B.

2. A method according to claim 1, characterized in that said extracting further comprises extracting expressive parameters at the syllable level.

3. A method according to claim 1, characterized in that mapping the varying relative parameters parameters from language A to language B, further comprises the step of converting the expressive parameters of language B, using word level converting tables and sentence level converting tables, into adjustment parameters for adjusting the text-to-speech generation means by word level converting and sentence level converting.

4. A speech-to-speech generation method, comprising the steps of:

recognizing the speech of dialect A and creating the corresponding text;

generating the speech of another dialect B according to the text, said speech-to-speech generation method is characterized by further comprising steps:

extracting expressive parameters from the speech of dialect A, said expressive parameters comprising pitch, volume and duration at a word level and intonation and sentence envelope at a sentence level; and obtaining normalized expressive parameters for dialect A based on a degree of variation of pitch, volume and duration at a word level and intonation and sentence envelope at a sentence level for words in a sentence and deriving relative expressive parameters from the normalized parameters;

comparing relative parameters of expressive speech with those of reference speech to identify varying relative parameters to be provided to said expressive parameters mapping means; and mapping the identified varying relative parameters from dialect A to dialect B to obtain adjustment parameters for language B, and driving the text-to-speech generating process using the adjustment parameters mapping results to synthesize expressive speech in dialect B.

5. A method according to claim 4, characterized in that said extracting further comprises extracting expressive parameters at the syllable level.

6. A method according to claim 4, characterized in that mapping the varying relative parameters from dialect A to dialect B, further comprises the step of converting the expressive parameters of dialect B, using word level converting tables and sentence level converting tables, into adjustment parameters for adjusting the text-to-speech generation means by word level converting and sentence level converting.

* * * * *